WILLIAM B. SCAIFE.
Kitchen-Boiler.
No. 4,393. Reissued May 23, 1871.
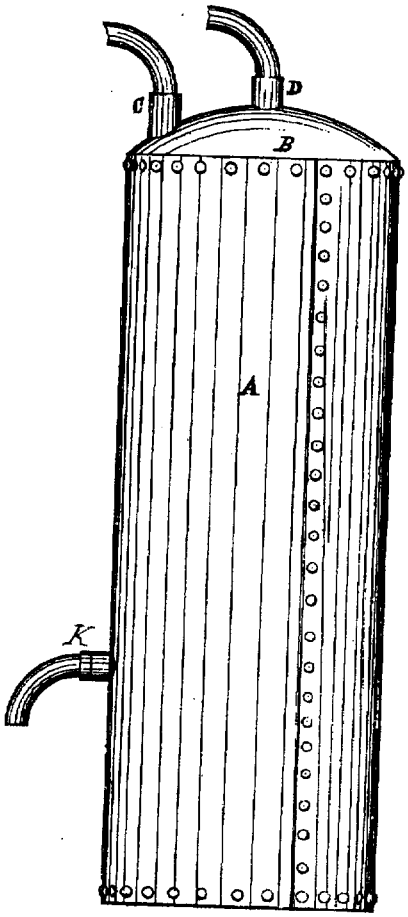
Witnesses.
Jno. D. Patton
Harry L. Miller.
Inventor.
Wm. B. Scaife
By L. L. Johnston his attorney
AM PHOTO-LITHOGRAPHIC CO. N.Y. (OSBORNE'S PROCESS.)

UNITED STATES PATENT OFFICE.

WILLIAM B. SCAIFE, OF PITTSBURG, PENNSYLVANIA.

DESIGN FOR A KITCHEN-BOILER.

Specification forming part of Letters Patent No. 4,224, dated July 12, 1870; Reissue No. 4,393, dated May 23, 1871.

*To all whom it may concern:*

Be it known that I, WILLIAM B. SCAIFE, of Pittsburg, in the county of Allegheny and State of Pennsylvania, have invented and produced a new and original Design for Kitchen-Boilers, which is clearly shown in the accompanying drawing, which forms part of my specification.

The body A is cylindrical in form, and the upper end, B, forms a section of a sphere. C and D represent the couplings or pipes.

What I claim is—

The design for a kitchen-boiler, herein described, substantially as shown in the accompanying drawing.

W. B. SCAIFE.

Witnesses:

A. C. JOHNSTON,

JAMES J. JOHNSTON.